7010X
G. A. Madeira,
Edge-Tool Grinder.
Patented Apr. 19, 1832.
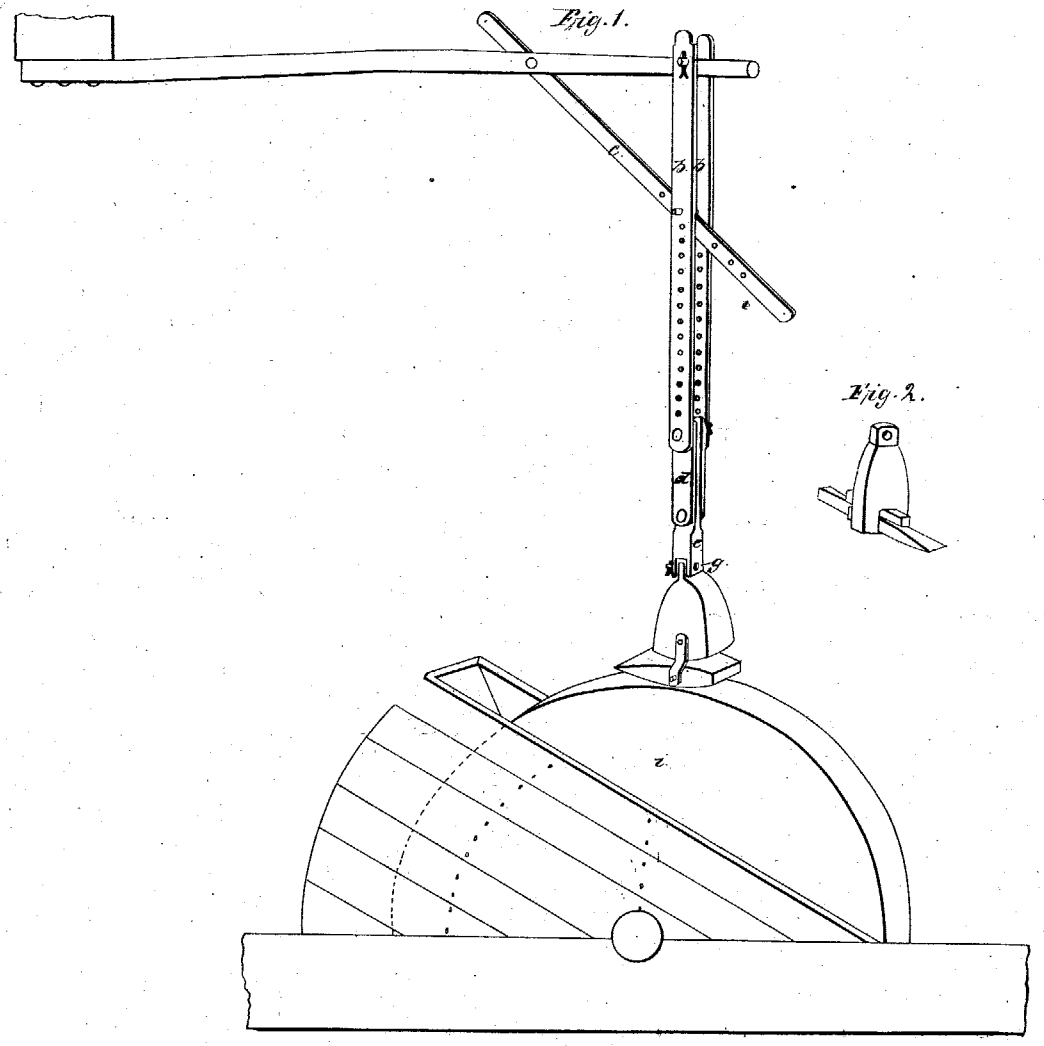
N. PETERS, PHOTO-LITHOGRAPHER, WASHINGTON, D. C.

7010X Apl 19, 1832

George A. Madeira, of Chambersburg, Pennsylvania

Letters Patent

The schedule referred to in these Letters Patent and making part of the same, containing a description in the words of the said George A. Madeira himself of his improvement in apparatus or machinery for holding and guiding Edge Tools &c.

To all whom it may concern, Be it known that I George A. Madeira of Chambersburg, Franklin County and Pennsylvania, have invented an apparatus or machinery for holding & guiding Edge Tools, and other articles, in the operation of grinding which Apparatus greatly facilitates the said operation and will enable an experienced hand to perform it with precision; and that the following is a full and exact description of the said Apparatus.

I use a spring pole, which is fixed along or near, the ceiling of the room, or workshop, in the manner of those used for the pole lathe, —— The elastic end of this pole is directly over the grind stone, and from it descends a part which I denominate the hanger, the hanger is hinged or jointed to the spring pole, so that the angle which they make with each other may be varied. —— A brace passes diagonally from the spring pole to the hanger, a mortise being made through each for that purpose, — This brace may be lengthened or shortened by means of pins which pass through holes in it, and in the spring pole and hanger, and serve to confine them in any required position, —— In order to adapt the hanger to articles of different sizes and kinds, it is made capable of being lengthened or shortened; this may be effected by dividing it and making one part to lap over the other, or by a long slot in one piece and a corresponding tongue on the other, with equidistant holes through them and pins, or screws, to adjust, or confine them, To admit of the articles which is to be ground being moved backwards and forwards on the stone, there is a hinge or rule joint, near the lower end of the hanger; and to allow of its transverse motion the block upon the underside of which the article is to be held, is attached to the hanger by a hinge or rule joint, in the reverse direction The block must vary in its form and construction according to the nature and form of the article to be ground and tho' articles may be held in their places, by means of screws, wedges, or otherwise —

No particular direction can be given for this part nor is it necessary, as every workman can readily adapt the block to the particular purpose which it is required to answer The block is sometimes made with a handle projecting from each side of it one for each hand When axes or other articles with eyes in them are to be ground the handle may pass through the eye, and form one part of the arrangement, by which it is attached to the block, — I have thus described the manner in which I generally form this apparatus, it is however susceptable of various modifications. whilst the general principle of its structure and action remains unchanged I do not therefore claim the exact and particular formation thereof herein set forth, but what I claim as my invention and for which I ask a patent, is the use of a spring pole, with a descending part, which I have called the hanger and a piece at the bottom thereof similar to what I have denominated the block, to receive and hold the article to be ground, the apparatus being furnished with joints to admit of motion in two directions and being adjustable in its length to suit different articles Witness S. Pearson, Robt. McCracken — George A. Madeira

67124